United States Patent [19]

Gurevich et al.

[11] E Patent Number: Re. 33,137

[45] Reissued Date of Patent: Dec. 26, 1989

[54] SUBMINIATURE FUSE

[75] Inventors: Leon Gurevich, St. Louis; Vernon R. Spaunhorst, Washington, both of Mo.

[73] Assignee: Cooper Industries, Inc., Houston, Tex.

[21] Appl. No.: 39,541

[22] Filed: Apr. 17, 1987

Related U.S. Patent Documents

Reissue of:

[64] Patent No.: 4,612,529
Issued: Sep. 16, 1986
Appl. No.: 715,799
Filed: Mar. 25, 1985

[51] Int. Cl.[4] ..... H01H 85/4

[52] U.S. Cl. ..... 337/255; 337/260; 337/262

[58] Field of Search ..... 337/255, 260, 262, 261, 337/263, 273, 293, 186, 187, 207, 214, 215, 216, 252; 29/623

[56] References Cited

U.S. PATENT DOCUMENTS

| | | | |
|---|---|---|---|
| 3,218,414 | 11/1965 | Swain et al. | 337/187 |
| 4,417,226 | 11/1983 | Asdollahi et al. | 337/273 |
| 4,636,765 | 1/1987 | Krueger | 337/273 |

*Primary Examiner*—H. Broome
*Attorney, Agent, or Firm*—Nelson Blish; Donald Verplancken

[57] ABSTRACT

A subminiature fuse is disclosed comprising two terminals, a substrate, a fusible conductor, and a unitary housing. The unitary housing is sealed and provides increased mechanical strength, thus reducing the risk of a catastrophic failure of the fuse. The upper portion of the fuse terminals are shaped into finger like projections adaptable to mechanically fastening the fusible conductor and the substrate thereto thus facilitating the manufacturing process. In one embodiment the fusible conductor and adjacent portions of the terminals and substrate are coated with a ceramic coating or adhesive. The housing is sealed by utrasonic welding or preferably in an insert molded plastic enclosure which is substantially devoid of air.

59 Claims, 3 Drawing Sheets

SUBMINIATURE FUSE

Matter enclosed in heavy brackets [ ] appears in the original patent but forms no part of this reissue specification; matter printed in italics indicates the additions made by reissue.

*This is a reissue of U.S. Pat. No. 4,612,529 for SUBMINIATURE FUSE which was granted on Sept. 16, 1986.*

TECHNICAL FIELD

This invention relates to fuses in general and more particularly to a subminiature electrical fuse of the type used for electrical circuit protection in applications where there is a limited amount of space. This type of fuse is especially useful to save space on printed circuit boards.

BACKGROUND OF THE INVENTION

Subminiature fuses, like other types of fuses, are used to protect circuit components from damage that can be caused by excess current flowing through the circuit. Excess current is generally categorized as either an overload current or a short circuit current. Overload current is generally considered to be in the range of 135 percent to 200 percent of normal or rated current. Short circuit current may be 1000 percent of rated current or greater.

Many conventional fuses are constructed from a fuse element and a two piece fuse housing comprising a cap and a base. During a short circuit condition, pressure inside the housing increases. Due to the small physical size of the subminiature fuse and hence the short arc clearing gap, the housing for such a fuse is subject to catastrophic failure problems that are not normally inherent in a physically larger fuse. There is a risk that the fuse housing will blow apart or rupture. In the two piece housing design, this normally occurs at the seal between the cap and the base. If the housing ruptures, this would not only expose a live arc, but would also prolong that arc, thereby potentially causing damage to circuit components downstream of the fuse due to the additional time required to fully interrupt the circuit.

Once the housing begins to leak, the pressure in the housing begins to decrease. This causes the interruption time to increase.

Those skilled in the art know that when the fuse element is subjected to short circuit current, the fuse element heats up until it reaches the melting point of the fuse element conductor. The rate of the heat build up is, among other things, a function of the magnitude of the excess current. Once the temperature of the conductor reaches its melting point, the conductor material rapidly [vaporized] *vaporizes* mixing vaporized metal atoms with the gas or air medium surrounding the conductor. Upon vaporization, an arc is formed in the gas mixture which is created by the vaporization of the fuse element. The resulting plasma acts as a conducting path for the arc. The increased temperature of the arc plasma also increases the pressure in the fuse housing. If the arc plasma becomes dense, the travel of the charged particles in the plasma is restricted. Decreased mobility of the charged particles increases the resistance of the gap, thereby acting to extinguish the arc.

There have been several attempts to solve this problem of catastrophic fuse failure in subminiature fuses.

One example is illustrated in the U.S. Pat. No. 4,417,226 to Asdollahi, et al. In this patent a ceramic lining is utilized in the interior of a two piece fuse housing to insulate the plastic body from the heat produced during a short circuit condition. Merely coating the interior of an air filled fuse housing with a ceramic lining does not provide a fast clearing fuse. The relatively large interior volume of air and a low out-gassing ceramic lining prevents the quick increase in pressure required for fast arc clearing. A lower pressure in the fuse housing tends to facilitate charged particle mobility in the plasma during interruption of an arc during a short circuit condition. This results in a longer arc time which results in a higher pressure metal rich gas. Such prolonged arcing raises the risk of catastrophic fuse failure.

Other examples of subminiature fuses are embodied in U.S. Pat. Nos. 2,941,059 to Sims, et al. and 3,775,723 to Mamrick, et al. Others have attempted but have failed, to reduce this risk of catastrophic failure by improving the strength of the fuse housing to prevent rupture thereof.

Thus, there exists the need to provide a subminiature fuse capable of properly interrupting short circuit current with a minimal risk of catastrophic failure. A subminiature fuse device with a short duration arcing time would be widely received by the industry.

SUMMARY OF THE INVENTION

In accordance with the present invention, a subminiature electrical fuse is disclosed for use primarily on circuit boards and other applications where physical space for electronic components is limited. The fuse assembly comprises two terminals, a substrate, and a fusible conductor. The fuse assembly is encased in a one piece or unitary molded plastic body. In one embodiment the one piece plastic housing contains two lips which are crimped together and ultrasonically welded thereby causing reflow of the plastic. The one piece or unitary housing disclosed has proven to be surprisingly superior to conventional two piece housings utilizing a separate cap and base. This one piece housing is able to maintain the internal pressure of the fuse for sufficient time for the arc to clear safely and quickly.

Conventional subminiature fuses run the risk of catastrophic failure during interruption of short circuit currents. This risk is created by the pressure build up in the fuse housing during a long duration arc interruption. Thus, it is desirable for the arc to clear as quickly as possible thus reducing the risk of catastrophic failure.

The fuse assembly in the preferred embodiment is coated with an insulating coating. Suitable insulating coatings include, but are not limited to, ceramic adhesive, stone sand [water glass] or other adhered fillers. The insulating coating absorbs the plasma and decreases the temperature thereof. The ceramic coating coats the fuse element, thereby making it substantially devoid of air. More importantly, the open channel in the ceramic, which is created by vaporization of the fusible conductor, has a small volume subject to pressurization. Since the open channel is significantly smaller, the pressure therein will be greater, thus resulting in improved fuse performance. The ceramic coating also improves fuse performance by increasing arc resistance through arc cooling.

Several embodiments of the present invention utilize a substrate to provide for both electrical and thermal insulation of the fuse terminals. During interruption of excess current it is necessary to maintain the desired spark gap distance. Since during interruption the temperature inside the fuse housing may rise to 400° F. to 500° F., the ceramic substrate is preferably capable of withstanding about 2000° F. In one embodiment the substrate also contains an aperture. This aperture is designed to be in communication with the fuse element when that element is not coated. By allowing the fuse element conductor to be in communication with the aperture, the overloading opening characteristics are enhanced.

Numerous other advantages and features of the present invention will become readily apparent from the following description of the invention and its various embodiments and from the claims and from the accompanying drawings.

DETAILED DESCRIPTION OF THE INVENTION

Figure 1:
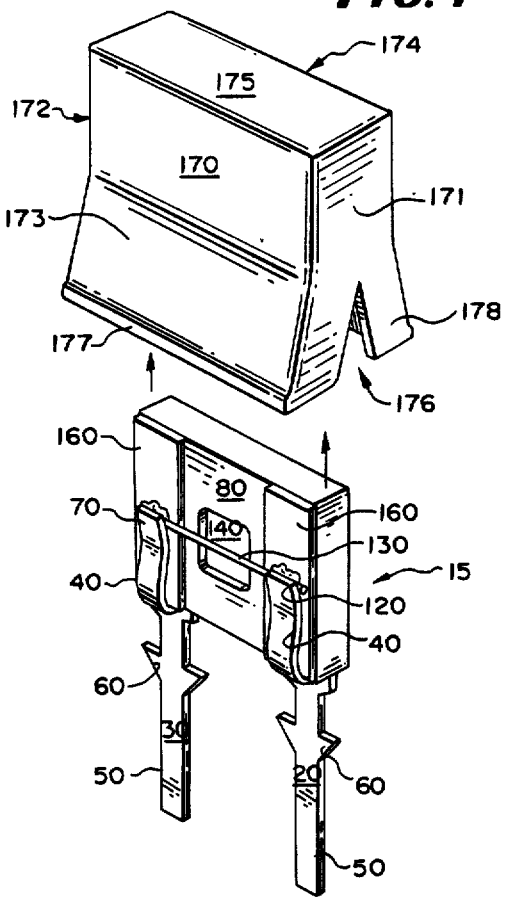
FIG. 1 is an exploded perspective view of the subminiature fuse in accordance with the present invention.

While this invention is susceptible of embodiment in many different forms, there [is] *are* shown in the drawings, which will herein be described in detail, several preferred embodiments of the invention. It should be understood however that the present disclosure is to be considered as an exemplification of the principles of the invention and is not intended to limit the invention to the specific embodiments illustrated.

Referring to the drawings, FIG. 1 illustrates an embodiment of the subminiature fuse 10 that is the subject of the present invention. The fuse 10 comprises a first terminal 20, a second terminal 30, an insulating means 80, a fusible conductor 130 and an enclosure 170.

The two terminals 20 and 30 are each comprised of a top portion 40 and a bottom portion 50. The bottom portion 50 of the terminals 20 and 30 is adapted to plug into a printed circuit (PC) board where it is soldered in place or into a fuse receptacle located on a PC board. The bottom portion 50 is essentially flat. Although the flat configuration is preferred, the invention is equally adaptable to other configurations, such as use of a circular cross section conductive material.

Terminal stops 60 can be located at a fixed distance from the end of the bottom portion 50 of each terminal 20 and 30. These stops 60 act as standoffs and are designed to limit the length that the bottom portions 50 of terminals 20, 30 can be inserted into a fuse receptacle. When the terminals 20 and 30 are inserted into a receptacle up to the stops 60, there is sufficient contact between the fuse terminals 20 and 30 and the connectors in the receptacle to establish the desired electrical connection. These stops 60 also prevent the housing 170 from contacting the printed circuit board in applications where the fuse is soldered directly on a PC board. Plastic standoffs can also be molded into the housing 170 and used to perform the same function as the stops 60.

Figure 3:
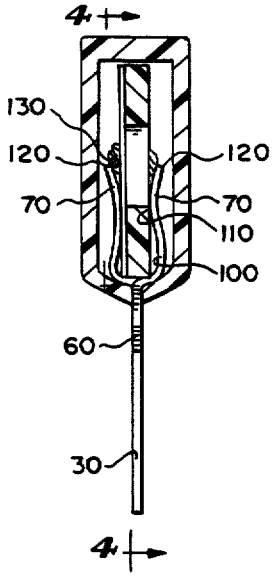
FIG. 3 is a *sectional* side view of the subminiature fuse shown in FIG. 1.
Figure 4:
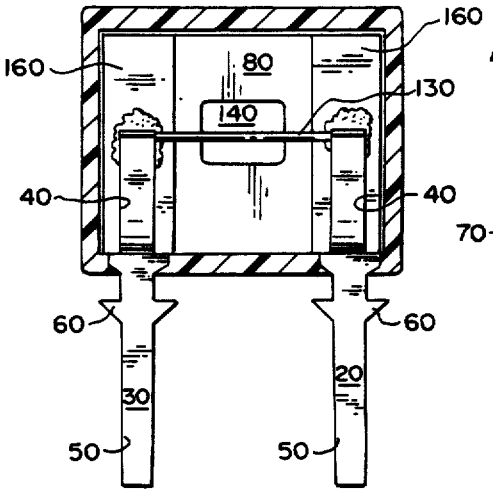
FIG. 4 is a sectional *front* view of the subminiature fuse shown in FIG. 1.

The top portion 40 of the terminals 20 and 30 is comprised of two or more terminal fingers 70. The fingers 70 are best illustrated in FIG. 3. These terminal fingers are used for several purposes. One purpose is to provide mechanical holding of the insulating means or substrate 80 during the manufacturing process. Each finger 70 is comprised of two curved portions 90 and 100 each forming an S-like configuration. The fingers 70 are joined at one end, with the curvatures 90 and 100 of each finger opposing each other. The overall configuration is fork-like and provides a spring compressive force at a contact point 110 on the fingers 70 to mechanically hold substrate 80. The tip 120 of each finger 70 is disposed at an acute angle relative to substrate 80. Ths angle is made just large enough to allow a conductor 130 to fit between the tips 120 and the substrate 80. This will allow for the conductor 130 to be drawn between the terminal finger 70 and the substrate 80 with minimal stress. Due to the fact that the conductor wire 130 has a small diameter, it is necessary to reduce or eliminate any potential stresses thereon.

In the preferred embodiment, the terminals 20 and 30 are made from copper alloy. However, other materials such as [phospher]*phosphor*-bronze and beryllium-bronze and other alloys of electrical conducting materials are also suitable. In the preferred embodiment the copper alloy conductors have a tensile strength close to phosphor-bronze. The tensile strength is preferably higher than the tensile strength of copper and lower than that of stainless steel.

Figure 5:
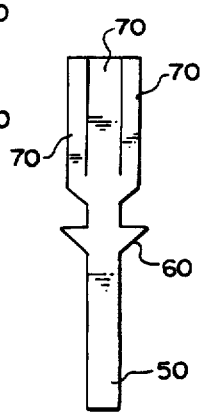
FIG. 5 is a front view of *one of* the fuse terminals of the subminiature fuse shown in FIG. 1.

The terminals 20 and 30 are made by stamping from a flat piece of conductor stock. As can be seen from FIG. 5, this process is very adaptable to forming three terminal [finger] *fingers* 70.

After the conductor material is stamped, the terminals 20 and 30 are coated with a tin or tin lead composition so as to form a solder reflow joint. This process [minimized] *minimizes* the amount of tin or tin lead composition necessary to form the solder reflow joint.

After the conductor material is stamped into the three finger embodiment, the central finger 70 is separated from the two outside fingers 70 to form a U-shaped slot [adapter] *adapted* to receive the substrate 80. Although three fingers are particularly adapted to providing the requisite mechanical strength to grasp the substrate 80, other embodiments could include the use of two, four or even more fingers.

An alternate method is to hot roll the tin or tin lead composition onto one side *of* the flat conductor stock prior to stamping the terminals 20 and 30. This process minimizes the amount of tin or tin lead composition *rolled* onto one side of the flat conductor stock prior to stamping the terminals 20 and 30. The coated conductor material is said to be solder clad.

The substrate 80 is used to mechanically link the two terminals 20 and 30. The substrate is flat and rectangular and is generally a box-like shape. The minimum length of the substrate between the terminals 20 and 30 is determined by the requisite spark gag required to interrupt an arc generated by a predetermined system voltage and excess current. However the length may be increased to facilitate handling during the manufacturing process.

During the arc interruption cycle, the temperature in the fuse housing can reach 400° F. to 500° F. Since the substrate is necessary to mechanically link the terminals 20 and 30 and to maintain the requisite spark gap distance, it is important that the substrate 80 not break down during the interruption cycle. Such breakdown of the substrate could cause catastrophic failure of the fuse. Also, it is important to use a material that will not carbonize at high temperatures, since it would support electrical conduction. For this reason, a material having the ability to withstand high temperature must be used. In the preferred embodiment, the subtrate 80 is comprised of a ceramic polycrystalline material such as alumina [silica oxide]. However, various other [ceramic polycrystalline] materials such as glass, beryllia ceramic, mica and organic fiber are also suitable.

Another important consideration in selecting the substrate 80 is that it have good dielectric properties. Poor dielectric materials would allow conduction across the substrate 80 during interruption. This could result in an increased interruption time and therefore catastrophic failure of the fuse 10. Ceramic polycrystalline materials, as well as being good thermal insulators, have excellent electrical dielectric strength and are therefore suitable for use as a material for the substrates 80.

In one embodiment the substrate 80 can be provided with one or more apertures 140. Since ceramic is a better heat conductor than air, exposing a small portion of the fusible conductor 130 to air results in a decrease in the fusing time for a given overload current.

Each end 160 of the substrate 80 is metallized to form a connection means for the terminals 20 and 30 and the fusible conductor. In the preferred embodiment, the metallizing is done with silver.

In addition to being a good electrical conductor, it is desirable that the conductive material deposited on the substrate have a very high density and also be relatively easy to process. Since silver can be fired or sintered in air, unlike copper, which must be sintered in the presence of nitrogen, silver is preferred. Other conductor materials, such as gold are equally suitable as conductor materials for the substrate. However, due to the cost factor, silver is preferred.

After the silver is deposited onto the substrate ends 160 and fired, the ends are next dipped into a tin or tin lead bath. This reduces oxidation and forms a solder reflow joint.

It is important that the solder reflow composition (e.g., tin lead) deposited onto the terminals 20 and 30 have the same melting temperature as the solder reflow composition into which the substrate [end] *ends* 160 are dipped. When the melting temperatures are the same or close to the same, a solder joint can be made by placing the terminals 20 and 30 in contact with the substrate ends 160 and merely applying heat. Without adding any additional solder, a solder joint is created when the solder reflow composition on the terminals 20 and 30 and on the substrate ends 160 reaches the melting point and is subsequently allowed to cool. Since the contacting points of the terminals 20 and 30 are completely covered with the solder reflow composition, as are the ends 160 of the substrate 80, a better solder joint is formed than would be if external solder material were applied to form the joint.

The fusible conductor 130 is connected between the two terminals 20 and 30 to form an electrical current path. The cross-section of the conductor is determined by the particular conductive material used, the normal current that will pass through the fuse 10 and the excess current fusing value desired. The fusible conductor can be a wire, a thick film, a thin film or any other form of conductor common to the industry.

Since a fuse 10 is placed in series with the device to be protected, it is necessary that the fuse 10 carry normal current without spurious failure. Therefore the conductor must be sized to pass the normal current without fusing. Also, the resistance of the particular conductor material must be considered. Conductors having a relatively low resistance can carry more current without fusing than conductors of the same size having a higher resistance. For example, nickel has a higher resistance than copper, therefore if nickel is used as a conductive material, a larger cross section of nickel conductor than copper conductor is necessary to carry the same current.

There are also other factors which influence conductor size. One, for instance, is the ability of the conductor to dissipate heat resulting from passing current through the conductor. Therefore, one or more apertures can be provided in the ceramic substrate 80 to decrease the ability of the conductor to dissipate heat. Since air is not as good of a heat conductor as ceramic, the fusing time decreases for overload currents. The apertures 140 are normally designed to be in communication with the center of the conductor. The center of the conductor is the hot spot. The end portions of the conductor which are attached to the terminals 20 and 30 conduct heat to the terminals as well as convectively transfer heat to the surrounding air. It is for this reason that the center is the hot spot of the conductor.

The conductor 130 is connected between the two terminals 20 and 30 by placing it between the substrate ends 160 and the tips 120 of the terminal fingers 70. Due to the solder cladding on the inside of the terminal fingers 70 and the substrate [edges] *ends* 160, the conductor 130 is fastened to terminal fingers 70 and the substrate ends 160 is heating up the contact point and allowing it to cool, thus forming a solder joint by the solder reflow method.

The terminals 20 and 30, substrate 80 and conductor 130 form an assembly. This assembly, in one embodiment, is housed in a one piece plastic box-like enclosure or housing 170, which is best illustrated in FIG. 1. The housing 170 is made of plastic material and is generally if a box-like shape. The housing has four sides 171, 172, 173 and 174, a top 175 and an open bottom 176. Two sides 171 and 172 have V-shaped notches while the other sides 173 and 174 contain lips 177 and 178. The lips 177 and 178 are comprised of portions of thick plastic.

Figure 2:
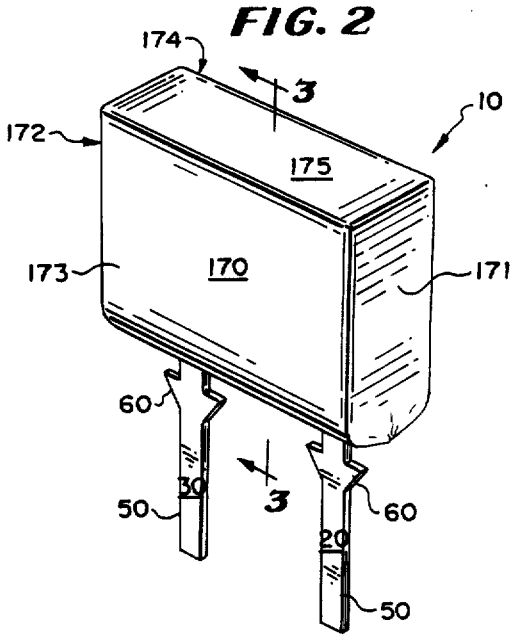
FIG. 2 is a perspective view of the subminiature fuse shown in FIG. 1.

The housing 170 is placed over the fuse assembly. Next the lips 177 *and 178* are crimped and simultaneously ultrasonically welded. The ultrasonic welding process causes reflow of the plastic to form and seal the bottom 176 of the housing. The V-shaped notches in sides 171 and 172 allow the lips 177 and 178 to be drawn together. Thus, a once piece sealed housing is formed around the fuse assembly as illustrated in FIG. 2. The use of the sealed one piece housing 170 reduces the risk of a catastrophic fuse failure. When the conductor 130 reaches its fusing temperature, it rapidly vaporizes forming a plasma which consists of a gas (usually air)

with ions and electrons. At the time the conductor 130 fuses an arc is formed between the terminals 20 and 30. Once the arc is established the pressure in the housing 170 increases. This pressure increases in the housing 170 limits the mobility of the charged particles in the plasma. It is important to decrease the charged particles mobility to decrease the time necessary to extinguish the arc and successfully interrupt the excess current.

Heretofore, two piece housings were used comprising a cap and a base. These two piece holdings would leak, due to the present increase in the housing during the interruption cycle. The housing leak resulted in a decrease in pressure in the housing thus allowing for increased mobility of the charged particles in the plasma. This results in a relatively low resistance conducting path between the fuse terminals thus prolonging the extinguishing time for interrupting the arc. The problem then becomes circuitous. Prolonging the arcing time results in even higher pressure which can lead to catastrophic failure of the fuse. Due to the relatively small sparkgap (distance between the fuse terminals) this problem is particularly acute in subminiature fuses.

The housing 170 disclosed in the present invention solves this problem by increasing the mechanical strength of the housing. Since the housing is unitary and comprised of one piece and is sealed by utrasonically welding, a virtually homogeneous one piece sealed housing is formed which is able to withstand the pressure resulting from interruption, thereby virtually eliminating catastrophic fuse failures.

Figure 6:
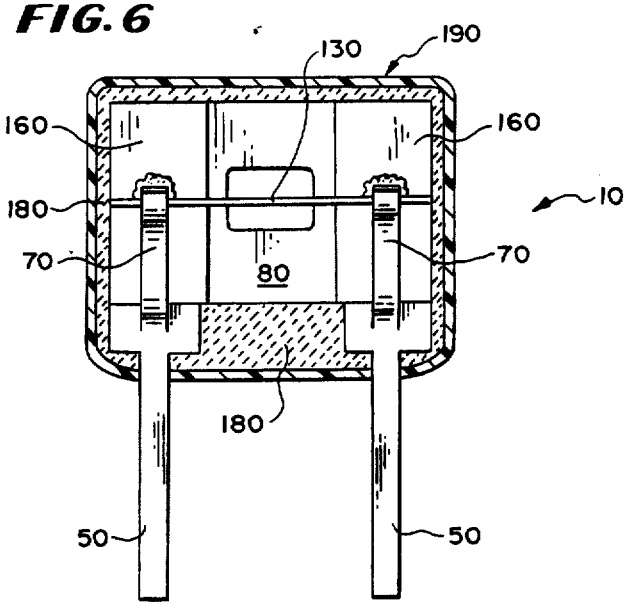
FIG. 6 is a *sectional* front view of the preferred embodiment of the fuse in accordance with the present invention.
Figure 7:
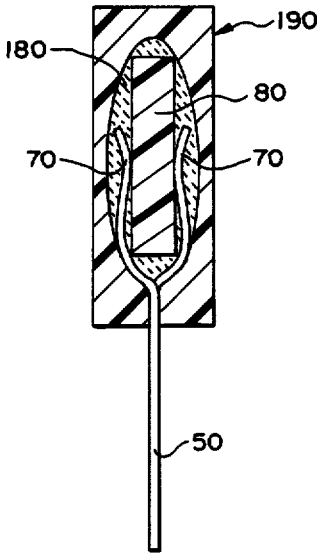
FIG. 7 is a *sectional* side view of the fuse shown in FIG. 6.

FIGS. 6 and 7 illustrate the preferred embodiment, which further improves the short circuit performance of a subminiature fuse shown in FIGS. 1 through 4. This embodiment comprises the fuse assembly as heretofore described which is then coated with an insulating coating such as a high temperature ceramic or ceramic adhesive 180. The ceramic coated assembly can then be inserted into a one-piece or unitary housing or into a plastic mold. In the mold, molten plastic, typically at thousands of pounds of pressure per square inch, is then injected into or compressed in the mold to form a homogeneous one piece housing 190 around the assembly so that no air is trapped within. This method of making the housing is known in the art as insert molding.

The ceramic coating 180 and the insert molded housing 190 improves the short circuit performance of the fuse by increasing the arc resistance during interruption. This can be accomplished by increasing the pressure and reducing the temperature of the plasma.

The ceramic coating 180 also acts to absorb the metal vapor during interruption thus reducing the arc plasma temperature. The solid interior of the insulating coating allows for only a very minute cylindrical chamber or volume to be pressurized. This volume is defined by the volume [occupies] *occupied* by the fusible conductor [150] *130* prior to vaporization thereof. Since the gas created by the arc must be contained in such a small area, this results in a much higher local pressure within the arc channel than in an air filled housing as taught, for example, by Asdollahi. Thus, fast clearing circuit interruption is attained. Additionally, since the ceramic 180 is also in communication with the housing 190, it acts to insulate the plastic housings 190 and 170 from the high temperature of the arc. This will eliminate carbonization of the plastic which can result in a restrike of the arc.

Figure 8:
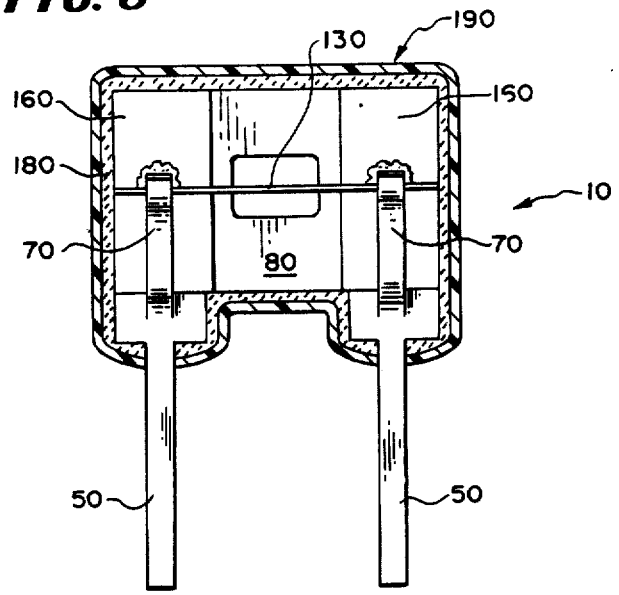
FIG. 8 is a *sectional* front view of an alternate embodiment of the subminiature fuse in accordance with the present invention.
Figure 9:
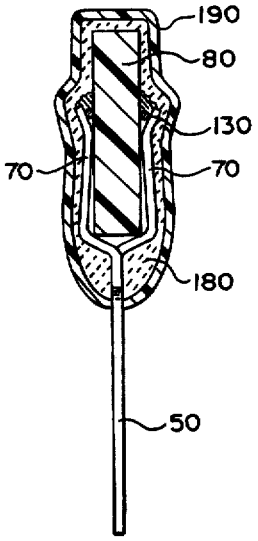
FIG. 9 is a *sectional* side view of the subminiature fuse shown in FIG. 8.

In an alternate embodiment, as shown in FIGS. 8 and 9, the fuse assembly as heretofore described is covered with an insulating coating 180. The coated assembly is then coated with epoxy which functions as the housing 190.

Thus, it should be apparent that a unique subminiature fuse is disclosed and a method for making the same. The fuse and the method for making them are readily adaptable to conventional design practices and automatable manufacturing techniques. Moreover, while the invention is described in conjunction with specific embodiments it should be apparent that there are alternatives, modifications and variations which will be apparent to those skilled in the art in light of the foregoing description. Accordingly, it is intended to cover all such alternatives, modifications and variations that fall within the spirit and broad scope of the appended claims.

We claim:

1. An electrical circuit protector which is adapted to be inserted into a printed circuit board, comprising:

(a) a first terminal and a second terminal each having a top portion and a bottom portion;

(b) insulating means having two ends for electrically and thermally insulating said first terminal from said second terminal and for holding said first terminal and said second terminal in substantially parallel relationship and spaced apart from each other by a predetermined distance, said top portions of said first terminal and said second terminal being disposed intermediate the ends of said insulating means;

(c) a fusible conductor connected between said first terminal and said second terminal and supported on said insulating means, the combination of said insulating means, said fusible conductor, and the portions of said first terminal and said second terminal defining an assembly;

(d) an electrically insulative material coating said assembly; and (e) unitary one piece enclosure means for housing said assembly.

2. An electrical circuit protector according to claim 1, wherein said insulative material comprises ceramic.

3. An electrical circuit protector according to claim 1, wherein said unitary enclosure means comprises epoxy.

4. An electrical circuit protector according to claim 1, wherein said unitary enclosure means is formed from molded plastic.

5. An electrical circuit protector according to claim 1, wherein said insulative material comprises an adhesive.

6. An electrical circuit protector according to claim 4, wherein said unitary enclosure means comprises a plastic housing, which is substantially devoid of air.

7. An electrical circuit protector according to claim 1, wherein said top portion of said first terminal comprises a plurality of fingers which are disposed in a fork-like configuration and which are adapted to receive said insulating means and to position said first terminal with respect to said insulating means.

8. An electrical circuit protector according to claim 1, wherein said insulating means has at least one aperture intermediate said two edges such that a portion of said conductor crosses over said aperture in said insulating means.

9. An electrical circuit protector according to claim 1, wherein said bottom portions of said first terminal and said second terminal are flat and define two ends.

10. An electrical circuit protector according to claim 1, wherein said bottom portion of said first terminal includes stop means, projecting from said bottom portion at a predetermined distance from one end of said first terminal for limiting the distance said first terminal and said second terminal can be inserted into a printed circuit board.

11. An electrical circuit protector according to claim 1, wherein said enclosure means has integrally molded plastic stand off means for limiting the distance that said first terminal and said second terminal can be inserted into a printed circuit board.

12. An electrical circuit protector according to claim 1, wherein said insulating means comprises a ceramic substrate.

13. An electrical circuit protector according to claim 12, wherein said insulating means has a general box-like rectangular shape.

14. An electrical circuit protector according to claim 1, wherein said edges of said insulating means are coated with a metal to facilitate soldering of said first terminal and second terminal thereto.

15. An electrical circuit protector according to claim 1, wherein said fusible conductor is connected to said first terminal and said second terminal by soldering.

16. An electrical circuit protector according to claim 1, wherein the cross section of said unitary enclosure means is substantially rectangular originally having one opened end and sealed around assembly.

17. An electrical circuit protector according to claim 16, wherein said unitary enclosure means is made of a plastic material.

18. An electrical circuit protector according to claim 1, wherein said unitary enclosure means is in the form of a box-like structure comprising two oppositely disposed pair of faces, defining a generally rectangular opening [,] *between* said two pair of faces, one *of* said pair of faces having V-shaped notches which are oppositely disposed to each other, said opening defining two lips which are oppositely disposed from each other and which are disposed adjacent to each other for sealing said opening.

19. An electrical circuit protector according to claim 1, wherein said enclosure means is comprised of an insert molded plastic body.

20. A method of manufacturing a subminature fuse, comprising the steps of:

(a) positioning two blade type terminals generally parallel to one another, each of said terminals having an upper portion and a lower portion with said upper portions having a pair of fingers;

(b) assembling a ceramic substrate between said [two] *pair of* fingers on an upper portion of each of said blade type terminals such that the blade type terminals are oppositely disposed along an edge of said ceramic substrate;

(c) connecting a fuse conductor between said blade type terminals so as to form an assembly; and (d) enclosing said assembly in a one piece housing.

21. A method of manufacturing a subminiature fuse according to claim 20, wherein said blade type terminals have solder alloy cladding on an inside surface of said fingers, wherein said substrate has metallized ends which contact said fingers of said terminals and, wherein said fuse conductor has two ends, said fuse conductor is connected to said terminals by placing between said metallized ends of said cladding by solder reflow between said fingers and the substrate.

22. A method of manufacturing a subminiature fuse according to claim 20, wherein said assembly is covered with an insulative material.

23. An electrical circuit protector which is adapted to be inserted into a printed circuit board, comprising:

(a) a first terminal and a second terminal each having a top portion and a bottom portion;

(b) insulating means having two ends for electrically and thermally insulating said first terminal from said second terminal and for holding said first terminal and said second terminal in substantially parallel relationship and spaced apart from each other by a predetermined distance, said top portions of said first terminal and said second terminal being disposed intermediate the ends of said insulating means, wherein said top portion of said first terminal comprises a plurality of fingers which are disposed in a fork-like configuration and which are adapted to receive said insulating means and to position said first terminal with respect to said insulating means;

(c) a fusible conductor connected between said first terminal and said second terminal and supported on said insulating means, the combination of said insulating means, said fusible conductor, and the portions of said first terminal and said second terminal defining an assembly; and (d) unitary one piece enclosure means for housing said assembly.

24. An electrical circuit protector according to claim 23, wherein said fusible conductor is disposed between one of said fingers and said insulating means.

25. An electrical circuit protector according to claim 23, wherein said fingers at said top portion of said first terminal are coated with a solder alloy cladding material.

26. An electrical circuit protector which is adapted to be inserted into a printed circuit board, comprising:

(a) a first terminal and a second terminal each having a top portion and a bottom portion;

(b) insulating means having two ends for electrically and thermally insulating said first terminal from said second terminal and for holding said first terminal and said second terminal in substantially parallel relationship and spaced apart from each other by a predetermined distance, said top portions of said first terminal and said second terminal being disposed intermediate the ends of said insulating means;

(c) a fusible conductor connected between said first terminal and said second terminal and supported on said insulating means, the combination of said insulating means, said fusible conductor, and the portions of said first terminal and said second terminal defining an assembly;

(d) unitary one piece enclosure means for housing said assembly wherein said unitary enclosure means is in the form of a box-like structure comprising two oppositely disposed pair of faces, defining a generally rectangular opening [,] *between* said two pair of faces, one of said pair of faces having V-shaped notches which are oppositely disposed to each other, said opening defining two lips which are oppositely disposed from each other and which are disposed adjacent to each other for sealing said opening.

*27. An electrical circuit protector comprising:*

*(a) a first terminal and a second terminal;*

(b) insulating means for holding said first terminal and said second terminal spaced apart from each other by a predetermined distance and electrically insulating said first terminal from said second terminal;

(c) a fusible conductor electrically connected to said first terminal and said second terminal;

(d) the combination of said insulating means, said fusible conductor and said first terminal and said second terminal defining an assembly;

(e) an electrically insulative and arc quenching material of ceramic, coating said assembly.

28. An electrical circuit protector as in claim 27, wherein said insulative material is nonporous.

29. An electrical circuit protector as in claim 27, wherein said coated assembly is housed in an enclosure means.

30. An electrical protector according to claim 29, wherein said enclosure means comprises epoxy.

31. An electrical circuit protector according to claim 29, wherein said enclosure means is formed from molded plastic.

32. An electrical circuit protector according to claim 31, wherein said enclosure means comprises a plastic housing, which encloses said coated assembly in a manner which results in a circuit protector which is substantially devoid of air.

33. An electrical circuit protector according to claim 27, wherein a top portion of said first terminal and said second terminal comprises a plurality of fingers which are disposed in a fork-like configuration and which are adapted to receive said insulating means and to position said terminals with respect to said insulating means.

34. An electrical circuit protector according to claim 27, wherein said insulating means has at least one aperture such that a portion of said conductor crosses over said aperture in said insulating means.

35. An electrical circuit protector according to claim 34, wherein said insulative material fills said aperture.

36. An electrical circuit protector comprising:

(a) a first terminal and a second terminal having terminal fingers and a bottom portion;

(b) insulating means for holding said first terminal and said second terminal at said terminal fingers spaced apart by a predetermined distance and electrically insulating said first terminal from said second terminal, said bottom portions projecting outward from said insulating means;

(c) a fusible conductor electrically connected to said first terminal and said second terminal at said terminal finger portion exterior said insulating means;

(d) the combination of said insulating means, said fusible conductor and said first terminal and said second terminal defining an assembly;

(e) an electrically insulative arc quenching material, coating at least a portion of said fusible conductor.

37. An electrical circuit protector as in claim 36, wherein said assembly is housed in an enclosure means.

38. An electrical circuit protector comprising:

(a) a first terminal and a second terminal;

(b) insulating means for holding said first terminal and said second terminal spaced apart from each other by a predetermined distance and electrically insulating said first terminal from said second terminal;

(c) a fusible conductor electrically connected to said first terminal and said second terminal;

(d) the combination of said insulating means, said fusible conductor and said first terminal and said second terminal defining an assembly;

(e) unitary one piece enclosure means for housing said assembly.

39. A method of manufacturing a subminiature fuse, comprising the steps of:

(a) positioning two terminals, adjacent each other one end of each of said terminals having fingers;

(b) assembling an insulating means between said fingers on said terminals such that each terminal holds an edge of said insulating means.

(c) connecting a fusible conductor between said terminals so as to form an assembly; and (d) coating at least a portion of said fusible conductor with an insulative material.

40. A method of manufacturing a subminiature fuse according to claim 39, wherein said assembly is substantially coated with an insulative material.

41. A method of manufacturing a subminiature fuse according to claim 39 or 40, wherein said assembly is housed in an enclosure means.

42. A method of manufacturing a subminiature fuse according to claim 39, wherein said assembly is inserted into a hollow enclosure and filling said enclosure with insulative material.

43. An electrical circuit protector according to claim 27 or 36, wherein said insulative material comprises ceramic.

44. An electrical circuit protector according to claim 38, wherein said unitary enclosure means comprises epoxy.

45. An electrical circuit protector according to claim 38, wherein said unitary enclosure means is formed from molded plastic.

46. An electrical circuit protector according to claim 27 or 36, wherein said insulative material comprises an adhesive.

47. An electrical circuit protector according to claim 38, wherein said enclosure means has integrally molded plastic stand off means for limiting the distance that said first terminal and said second terminal can be inserted into a printed circuit board.

48. An electrical circuit protector according to claim 27 or 36, wherein said insulating means comprises a ceramic substrate.

49. An electrical circuit protector according to claim 27 or 36, wherein said fusible conductor is connected to said first terminal and said second terminal by soldering.

50. An electrical circuit protector according to claim 38, wherein the cross section of said unitary enclosure means is substantially rectangular originally having one opened end and sealed around assembly.

51. An electrical circuit protector according to claim 38, wherein said unitary enclosure means is in the form of a box-like structure comprising two oppositely disposed pair of faces, defining a generally rectangular opening, between said two pair of faces, one said pair of faces having V-shaped notches which are oppositely disposed to each other, said opening defining two lips which are oppositely disposed from each other and which are disposed adjacent to each other for sealing said opening.

52. An electrical circuit protector according to claim 29 or 37, wherein said enclosure means is comprised of an insert molded plastic body.

53. An electrical circuit protector as in claim 36, wherein said insulative material is nonporous.

54. An electrical circuit protector according to claim 37, wherein said enclosure means comprises epoxy.

55. An electrical circuit protector according to claim 37, wherein said enclosure means is formed from molded plastic.

*56. An electrical circuit protector according to claim 36, wherein a top portion of said first terminal comprises a plurality of fingers which are disposed in a fork-like configuration and which are adapted to receive said insulating means and to position said terminals with respect to said insulating means.*

*57. An electrical circuit protector according to claim 36, wherein said insulating means has at least one aperture such that a portion of said conductor crosses over said aperture in said insulating means.*

*58. An electrical circuit protector according to claim 55, wherein said enclosure means comprises a plastic housing, which encloses said coated assembly in a matter which results in a circuit protector which is substantially devoid of air.*

*59. An electrical circuit protector according to claim 57, wherein said insulative material fills said aperture.*

* * * * *